United States Patent [19]

Scheffer, Sr.

[11] Patent Number: 4,701,991

[45] Date of Patent: Oct. 27, 1987

[54] METHOD FOR MAKING CHANNEL LETTERS FOR SIGNS

[76] Inventor: Louis G. Scheffer, Sr., 1831 W. 19th St., Yuma, Ariz. 85364

[21] Appl. No.: 787,515

[22] Filed: Oct. 15, 1985

Related U.S. Application Data

[63] Continuation-in-part of Ser. No. 622,067, Jun. 19, 1984, abandoned.

[51] Int. Cl.⁴ .............................................. B23P 11/02

[52] U.S. Cl. ...................................................... 29/450

[58] Field of Search ......................... 29/450, 451, 453; 434/172; 350/320; 40/552, 626, 632, 630; 256/65; 403/252, 397

[56] References Cited

U.S. PATENT DOCUMENTS

| | | | |
|---|---|---|---|
| 1,407,085 | 2/1922 | Rau | 40/628 |
| 1,940,205 | 12/1933 | Craig | 40/626 |
| 3,163,702 | 12/1964 | Warhol | 29/451 UX |
| 3,254,436 | 6/1966 | Bank | 40/596 X |
| 3,293,738 | 12/1966 | Caldwell et al. | 29/451 |
| 3,360,847 | 1/1968 | Chick et al. | 29/451 |
| 3,388,600 | 6/1968 | Gorgens et al. | 29/453 X |
| 3,487,529 | 1/1970 | Serio, Jr. | 29/451 X |
| 3,707,300 | 12/1972 | Tamburro et al. | 40/626 |
| 3,811,211 | 5/1974 | Morgan | 40/628 |
| 4,140,405 | 2/1979 | Shapiro et al. | 40/596 |
| 4,202,123 | 5/1980 | Witt | 40/596 |
| 4,450,640 | 5/1984 | Shapiro et al. | 40/596 |

FOREIGN PATENT DOCUMENTS

| | | | |
|---|---|---|---|
| 6322 | 1/1980 | European Pat. Off. | 256/65 |
| 2115774 | 9/1983 | United Kingdom | 40/626 |

*Primary Examiner*—Charlie T. Moon

*Attorney, Agent, or Firm*—Cahill, Sutton & Thomas

[57] ABSTRACT

Plastic letter faces and letter backs are pre-cut, and a continuous edge groove or grooves are cut along the inner surface of the letter face adjacent to all edges of the letter face. A strip of plastic edge joint material is adhesively attached to a length of thin metal channel side material. The edge joint strip has a continuous groove therein for receiving the edge of a letter face and also includes a snap lock element that extends into the edge groove or grooves of the letter face when the edge of the letter face is inserted into the edge joint groove. After bending the channel side material to conform to the shape of the letter face, the edge of the letter face is inserted into the groove of the edge joint strip. The snap lock element retains the letter face edge permanently in place, allowing the partially constructed channel letter to be set aside. Later, the letter back is snap-attached to the bottom edge of the channel side of the letter.

5 Claims, 11 Drawing Figures

FIG. 7A
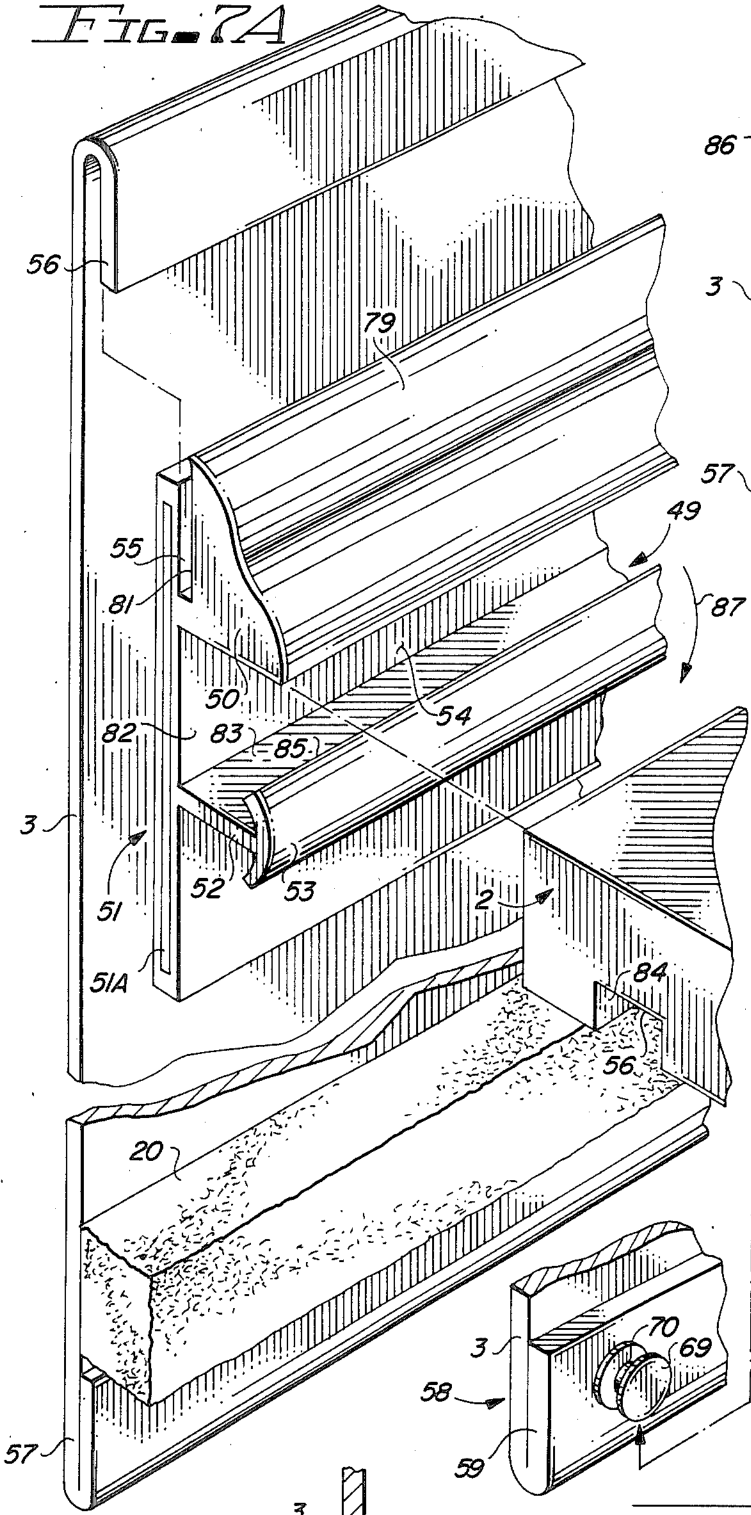
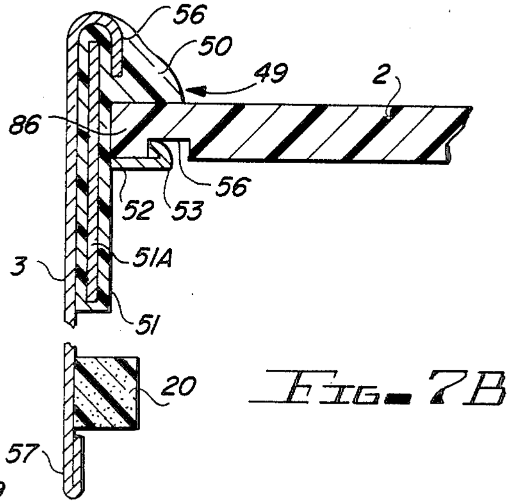
FIG. 7B
FIG. 8
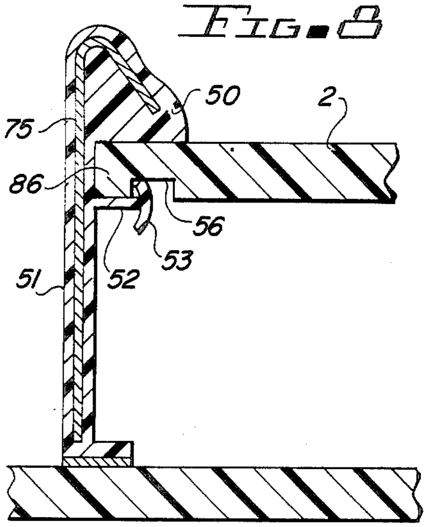
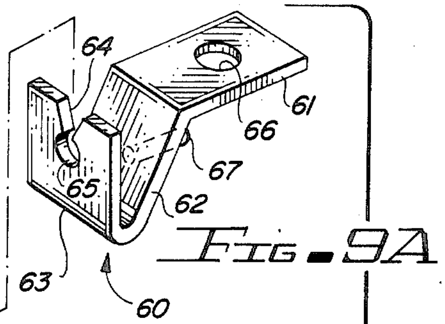
FIG. 9A
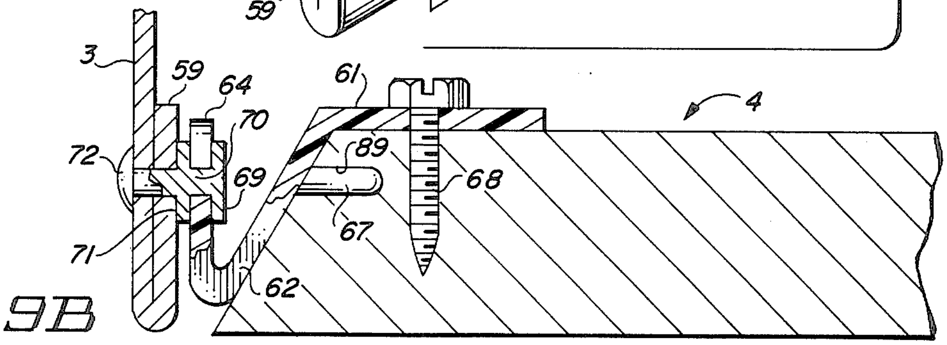
FIG. 9B

METHOD FOR MAKING CHANNEL LETTERS FOR SIGNS

CROSS-REFERENCE TO RELATED APPLICATION

This application is a continuation-in-part of my pending patent application entitled "APPARATUS AND METHOD FOR MAKING CHANNEL LETTERS FOR SIGNS", Ser. No. 622,067, filed June 19, 1984, now abandoned.

BACKGROUND OF THE INVENTION

The invention relates to methods and apparatus for making channel letters for commercial signs, and more particularly to apparatus and methods for reducing the cost and labor involved in making channel letters by providing snap connectors for attachment and removal of plastic letter faces from the metal channel sides of the letters, and by providing snap connectors for attachment and removal of the letter backs.

Channel letters are known to those skilled in the art of making commercial signs as the most expensive form of lettering, and are generally also regarded as the most attractive form of sign lettering. Briefly, channel letters usually include a wood back having the shape of the letter to be formed. Electrical lighting fixtures, such as neon tubing and mounting brackets, are attached to the wood letter back. Metal channel siding, frequently formed of aluminum with a painted or otherwise finished exterior surface, is attached to and sealed to the letter back, giving depth to the letter to be formed. Typically, a colored, transluscent plastic letter face is attached to the front edge portion of the channel side material.

The commercial sign-making industry is a large, labor intensive, multi-million dollar international industry. Although there are several major competitors in the business of supplying the channel siding material usually used in making channel letters, including the Heath Northwest, Inc. Company of Yakima, Wash., with its patented CHANNELUME channel letter fabrication technique, and the Let-R-Edge Company of Hayward, Calif., and a few others who have made innovations in this field, the industry of making channel letters still remains highly labor intensive. U.S. Pat. No. 3,414,305 is generally indicative of the state of the art, as is the CHANNELUME technical brochure entitled "Channelume - An Exciting New Concept in Technical Letter Fabrication" published by Heath Northwest, Inc., and incorporated by reference herein.

Generally, the standard prior manufacturing procedures involve attaching aluminum clad marine plywood referred to as "armored plywood" to the plastic letter facing material, and then attaching the letter "layout pattern" to the other surface of the plastic letter facing material, simultaneously cutting out the letter backs and letter faces with a bandsaw, then using various laborious techniques to bend the metal channel siding material (such as "Channelume or Let-R-Edge" material) to conform to the desired letter shape, using various tools such as a CHANNELUME break devices or a LET R-EDGE break device. Various roller devices, pegboard, and wedge and peg techniques are used to hold and maintain the letter back material, the channel side material, and the letter faces in proper alignment while the channel siding material is glued and/or attached to the letter backing material. The procedures for marking and bending the prior metal channel siding material and attaching it to the letter back and the letter face are especially laborious. Yet, no practical technique is yet known for significantly reducing the high amount of labor required for this phase of conventional channel letter construction techniques.

Furthermore, even after conventional channel letters have been installed, they occasionally require maintenance. For example, it is occasionally necessary to replace defective neon lighting elements inside the channel letters. When such maintenance is required, the procedure for removing the letter face and channel side to achieve access to the internal lighting components of the channel letter lighting system or to clean the interior surface of the transluscent letter face is quite laborious. Furthermore, some of the prior materials used for plastic edging and channel siding are subject to gradual deterioration by sunlight. Such deterioration leads to cracks and openings which allow dust to enter into the interior of the sign, sometimes reducing the amount of light that can pass through the plastic letter facings when layers of dust build up on the inner surfaces of letter faces.

It would be highly desirable to be able to use unbreakable plastic material, such as LEXAN, for letter faces for signs that are subject to destructive forces, such as vandalism. Unfortunately, there are no readily available glue substances that are capable of reliably attaching presently available "unbreakable" plastic materials to present available letter edge materials, such as BUTYRATE. Similarly, it would be highly desirable to be able to use "second side painted" plastic letter faces. "Second side" painted letter faces are clear plastic letter faces with the inner face spray painted. This can be advantageous because there are many more shades of paint available than there are shades of tinted plastic material that is suitable for making letter faces.

Although the technique for making channel letters described in the parent application results in a great improvement over prior techniques, further development of the technique has resulted in significant improvements which are the subject of the present application.

SUMMARY OF THE INVENTION

Accordingly, it is an object of the invention to provide an improved structure and technique for making channel letters with substantially lower labor cost than previously has been achieved in the art.

It is another object of the invention to provide an improved apparatus and method for making channel letters to significantly reduce the amount of effort and labor required to gain access to internal lighting components of installed channel letters.

It is another object of the invention to provide an improved channel letter without use of glue to attach the plastic letter face to the letter edging material.

It is another object of the invention to provide an improved, reliable channel letter using "unbreakable" plastic letter face material, such as LEXAN plastic or "second surface painted" plastic letter faces that cannot, as a practical matter, be glued with presently available glue or adhesives.

It is another object of the invention to provide an improved channel letter manufacturing system that provides greater resistance to entry of dust and water than prior art channel letters.

It is another object of the invention to provide an improvement on the channel letter technique described in the above indicated parent application.

Briefly described, and in accordance with one embodiment thereof, the invention provides an improved channel letter apparatus and method of making channel letters for signs wherein armored or aluminum or metal clad marine plywood material used for the letter backs is attached to the letter face material (typically translucent colored plastic) by means of double sided tape, and the letter shape is simultaneously cut out to form both the letter back and the letter face; metal channel side material is provided with an adhesively attached strip of snap-on connector material along the inner front edge surface thereof, and a strip of mating snap-on connector material is adhesively attached around the periphery of the letter face, the letter face then is snap-connected to the front edge portion of channel side material that has been shaped to conform to the shape of the letter face; an armored plywood backing material is then attached, typically by screws, onto the bare inner edge surface portion of the channel material and sealed thereto by means of a foam gasket that is adhesively attached along the rear inner edge portion of the channel side; the letter face then is removed from the channel letter by disengaging the mating snap connectors, typically with the aid of an elongated hook tool to allow any needed connections of interior lighting fixtures to be made or completed. The partially completed channel letter is then installed in its desired permanent location, and any necessary electrical connections are made, after which the letter face is again snap-connected onto the front of the channel letter to complete the installation.

In another embodiment of the invention, shallow grooves are cut by means of a router with an edge guide in the lower surface of the plastic letter face, along all edges of the letter face. A plastic edge joint strip is adhesively attached to the inner "top" surface of the channel side material. The edge joint strip has a groove therein having a predetermined depth and width equal to the thickness of the letter face. A snap lock element is provided on the lower inner edge of the edge joint groove to effectuate "snapping" the edge groove of the letter face into the edge joint groove. After bending the channel side material and the edge joint strip thereon to conform to the shape of the letter face, the edge of the letter face is snapped into the edge joint groove. The snap lock element retains the letter face edge in the edge joint groove, eliminating the need to provide any other technique for maintaining the proper position of the channel side and the letter face until the glue sets, as is the case if prior art glued letter edge connections are utilized In another embodiment of the invention, brackets are attached to the edge of the letter back, wherein each bracket includes one element of a snap locking mechanism, in the form of a V groove with an enlarged circular hole at the bottom of the V grove. The other member of the snap locking mechanism is attached to the inner surface of the bottom edge of the channel side material, in the form of a rivet-like element that snaps into the circular hole in the V groove and has a disk-shaped retaining flange thereon to prevent lateral movement out of the hole.

In another embodiment of the invention, plastic, aluminum filled channel side material has an edge joint integral therewith, wherein an edge joint groove and snap locking means receive the edge of the letter face and engage the edge groove thereof in the manner described above. A "foot" is provided on the lower end of the plastic channel side material to effectuate gluing of the channel side material to a back plate.

BRIEF DESCRIPTION OF THE DRAWINGS

FIG. 7A is a partial perspective view of an alternate embodiment of the invention.

FIG. 7B is a section view of the embodiment of the invention shown in FIG. 7A.

FIG. 8 is a partial section view of another embodiment of the invention.

FIG. 9A is an exploded perspective view of an alternate means for attaching the letter back of the channel letter of the invention.

FIG. 9B is a section view useful in explaining the utilization of the device shown in FIG. 9A.

DETAILED DESCRIPTION OF THE INVENTION

Figure 1:
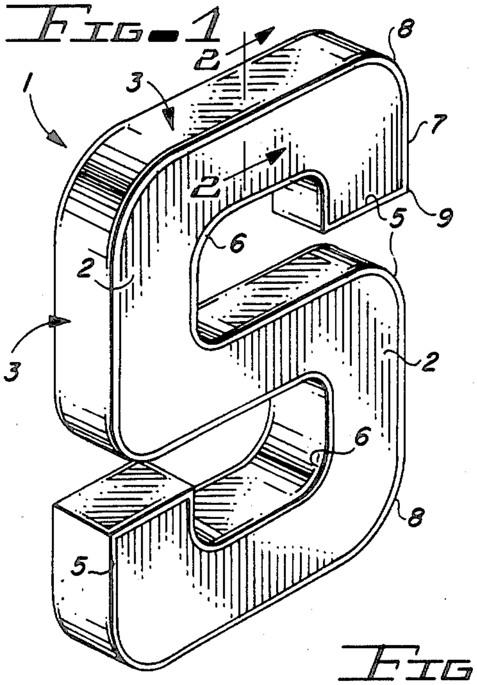
FIG. 1 is a perspective view of a channel letter constructed in accordance with the present invention.

Before reading the description of the preferred embodiments, it will be helpful to note that FIGS. 1–6 illustrate the embodiments of the invention described in the parent application, and FIGS. 7A–7C, 8, and 9A–9C illustrate the further improved embodiments of the invention of the present continuation-in-part application.

Referring now to FIGS. 1–4, the basic features of a channel letter and construction technique of the present invention will be described. Reference numeral 1 designates a typical channel letter. It has a letter face 2, which typically is composed of translucent colored plastic, and channel siding material 3, which may be composed of sheet metal or aluminum having a smooth painted exterior surface or is composed of formable plastic material with an aluminum filler to provide the formability. A letter back 4 (FIGS. 2 and 3) has precisely the same stylized shape as the letter face 2, and is typically composed of armoured plywood, which is marine plywood clad with thin aluminum on the opposed major surfaces thereof. If the letter is to be electrically illuminated, neon lights such as 15 are attached by means of a suitable bracket 16 to the letter back 4. The neon light tubing may be shaped to conform to the general stylized shape of the channel letter. Other types of internal electrical illumination also can be used.

It can be seen that a typical channel letter has some portions such as 7 (FIG. 1) wherein the channel siding is flat, some other portions such as 8 wherein the channel siding has generally convex curvature, and other portions such as 6 which have generally concave curvature.

Typically a channel letter will have a circumferential molding, or a lip 5 to provide a "transition" between the metal channel siding material 3 and the flat plastic letter face 2.

Figure 3:
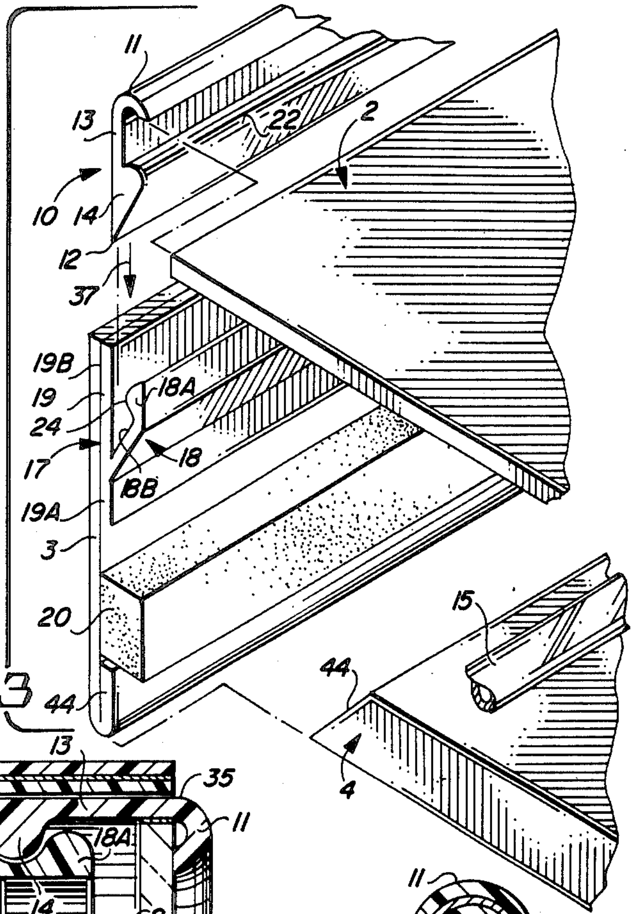
FIG. 3 is an exploded partial perspective view useful in explaining the construction of FIGS. 1 and 2.

In accordance with the present invention, the front edge of the channel siding material is not glued or adhesively attached to the peripheral edge of the plastic letter face 2, as in the prior art. Instead, a strip of plastic, easily formable male snap lock material 10 is adhesively attached to the peripheral edge of the letter face 2. A corresponding female snap lock connector strip 17 is adhesively attached along the inner front edge portion of the channel siding material 3, as shown in FIGS. 2 and 3.

Figure 2:
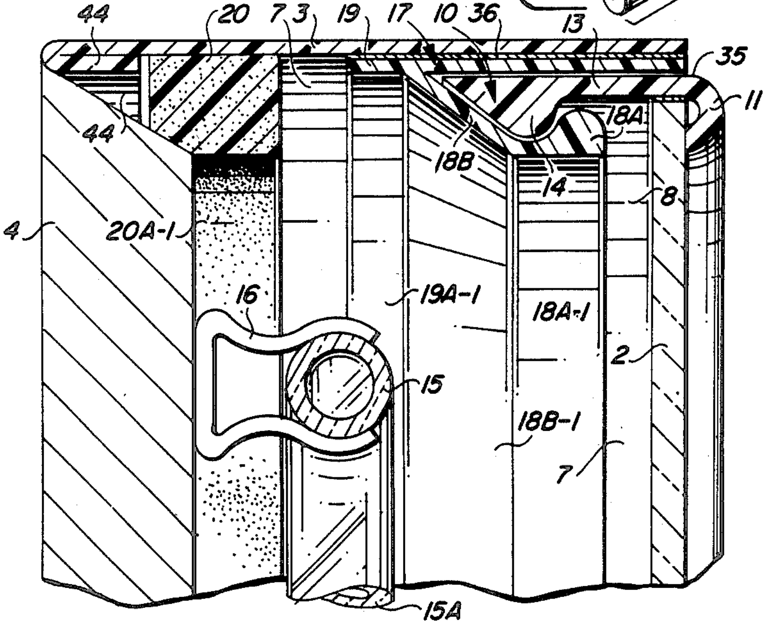
FIG. 2 is a partial section view taken along section line 2—2 of FIG. 1.

This allows the channel letter to be manufactured much more easily than the prior art channel letters, because once the letter face 2 is cut out, the strip of male snap-lock in connector 10 can be easily adhesively attached, as indicated by 35, along the edge surface of letter face 2, as shown in FIG. 2. The channel siding 3, which can be aluminum or sheet metal, can have a corresponding female snap-lock in connector 17 adhesively attached to its front edge surface, the adhesive connection being indicated by reference numeral 36. Then, the letter face 2 can be aligned with and connected to the channel siding 3 by simply forcing the male connector 10 in the direction of arrow 37 (FIG. 3), so that the enlarged body 14 of male snap-lock connector 10 is inserted into and thereby locked into the female snap-lock connector 17 in the manner shown in FIG. 2.

Figure 4:
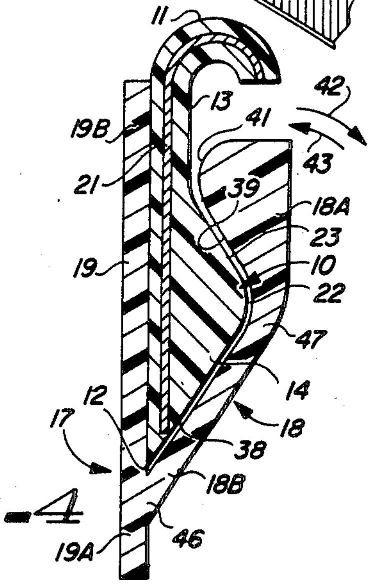
FIG. 4 is an enlarged section view illustrating the male and female snap connector elements used in the channel letter construction technique of the present invention.

At this point, it will be convenient to refer to FIG. 4, which is an enlarged view showing the male snap-lock connector 10 engaged with the female snap-lock connector 17. The male snap-lock connector 10 includes an inverted J-shaped upper portion, including a curved portion 11 and a neck 13. The lower end of neck 13 is attached to an enlarged body portion 14 having a lower sloped surface 38, and an upper sloped surface 23, and a rounded curve 22 between sloped surfaces 38 and 23. The lower portion of body 14 is pointed, as indicated by reference numeral 12.

The female snap-lock connector 17 includes a base plate 19, having an upper portion 19B above point 12 and a lower portion 19A below point 12. A sloped arm 18B extends outwardly and upwardly to the right of base plate 19 at the same slope as the slope of surface 38 of the male-snap lock connector 10. At the upper end of portion 18B of arm 18 is an enlarged head 18A. Enlarged head 18A has an upper surface 39, the slope of which corresponds to the slope of upper surface 23 of the male snap-lock connector 10.

Male snap-lock connector 10 can be made to be easily formable by provision of a layer of thin aluminum 21 therein. The technology for doing this is well developed and is included in the channel side material manufactured by the Let-R-Edge Company, mentioned above.

It can be seen that as the male connector 10 is inserted into the female connector 17, the lower sloped surface 38 moves into the gap between the rounded surface 41 of enlarged head 18A, causing arm 18 and enlarged head 18A to be "rocked" outward in the direction of arrow 42. As insertion of male connector 10 continues, the outermost curve 22 of body 14 passes over the rounded surface 41, which then rocks backward in the direction of arrow 43 to the configuration shown in FIG. 4, with the inner surface 39 of enlarged head 38A pressing downward and inward against the upper sloped surface 23 of male snap-lock connector 10.

By applying a sufficient upward force on male snap-lock connector 10 while holding the female snap-lock connector 17 stationary, it can be seen that surface 23 of body portion 14 of male connector 10 can slide against surface 39 of enlarged head 18A, forcing it outward in the direction of arrow 42. This allows relatively easy removal of male connector 10 from female connector 17. Thus, the letter face 2, with the male snap-lock strip connector 10 attached to its outer peripheral edge, can be easily locked into or removed from the channel siding material 3.

At this point, it may be helpful to describe a typical overall manufacturing process for manufacturing and installing channel letters using the above-mentioned snap locking technique.

As is the practice in making conventional channel letters, the shape of the letter back 4 and letter face 2 is accomplished by double-sided taping them together and using a band saw or the like to produce the desired stylized letter shape. The armored plywood is then beveled to produce a slope, such as the one indicated by reference numeral 44 in FIG. 3, of approximately 15° relative to the plane of the channel siding, to ease the insertion of letter back 4 into the back side of the shaped channel siding 3.

At this point, it is noteworthy that the lower edge of the channel siding material 3 may be provided with a "back folded" portion 45 for increased structural strength. Adjacent to the back folded portion 44, a foam gasket 22 is adhesively attached to the inner surface of the channel siding material 3 for the purpose of sealing the interior of the channel letter against both the alumimum channel siding 3 and the armored plywood 4, as is best seen in FIG. 2.

After the letter back 4 and the letter face 2 have been sawed to their desired shape, and the male snap-lock strip 10 has been adhesively attached to the letter face 2. Meanwhile, the neon tubing or other internal electrical lighting fixtures 15 are attached to the inner surface of the letter back 4.

Various conventional techniques can be applied, using various "brake" tools to provide the proper bends in the channel siding 3 in order to make it conform to the shape of the letter face 2. Then, the letter face 2 is aligned with the preformed channel siding material 3, and the male snap-lock connector strip 10 of the letter face is simply "snapped" into the female snap-lock connecting strip 17 of the channel siding material.

The various holes that are needed in the letter back 4 to facilitate attachment of the interior lighting brackets 16 and the like can be drilled. Then, the partially constructed channel letter consisting of letter face 2 snapped onto the channel siding 3 is slipped over the beveled edge 44 of the letter back 4, so that sealing engagement with the foam rubber gasket 20 is achieved. Screws then are utilized to permanently attach the back inner edge surface of the channel siding 3 to the beveled edges 44 of the letter back 4.

Figure 5:
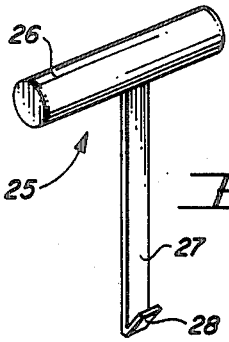
FIG. 5 is a perspective view of a removal tool useful in the construction and/or maintenance of the channel letters of the present invention.
Figure 6:
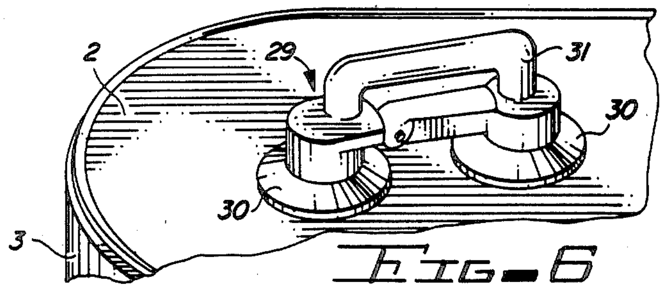
FIG. 6 is a partial perspective view of a suction cup tool which may be useful in removing the letter faces of the channel letters of the present invention.

Then, the narrow shank 27 of a hook tool 25 such as the one shown in FIG. 5 is inserted between outer surface of the male snap-lock connector 10 and the inner surface of the upper base member 19B (FIG. 3), so that the hook 28 on the lower end of shank 27 slips over the pointed lower end 12 of the male snap locking connector 10. The handle 26 of tool 25 is utilized, possibly in conjunction with a suction cup such as 29 shown in FIG. 6, to unlock the letter face 2 from the channel siding material 3. The letter face is then set aside.

Next, the portion of the channel letter including letter back 4, the internal lighting fixtures 15, 16 and the channel siding 3 permanently attached to the letter back 4 are transported as a unit to the permanent installation site and are installed. The necessary electrical connections are made. The letter face 2 then is installed simply by aligning it with the front of the already partially installed channel letter and then "snapping" it into place.

When it is necessary to perform maintenance operations on the lighting apparatus within the channel letter, the letter face 2 can be easily removed in the fashion described above.

Thus, the above disclosed embodiment of the invention represents a breakthrough in the field of making channel letters by very substantially reducing the amount of labor required for attaching the letter faces to the channel siding material. The invention also reduces the amount of labor required for maintanence of the interior lighting fixtures of the letter.

It should be appreciated that the particular design of the male snap-lock member 10 and the female snap-lock member 17 allows both of these members to be bent and formed easily to follow the contour of the peripheral edge of the letter face and the corresponding curvature of the channel siding, respectively. At "convex" bends of the channel siding, as seen from the outer surface thereof, occur, the arm 18 of the female snap locking member 17 will tend to pivot slightly about the pivot points indicated by reference numeral 46 and 47 whereby the enlarged head 18A moves toward the base 19B, tending to attain the same radius of curvature as the section 19B of the base. This will tend to help lock in the inserted male snap locking member 10 in place. Similarly, at the locations of "concave" curvature of the outer surface of the channel siding 3, the same type of pivoting of the arm 18 will occur, again so that the enlarged head portion 18A will tend to attain the same radius of curvature as the base portion 19B.

Due to the fact that the male and female snap locking members 10 and 17 are composed of flexible plastic, such as Butyrate, and despite the tendency of the enlarged head 18A to move toward base section 19B occurs at both concave and convex bends in the channel siding, it will still be relatively easy to insert the male snap locking member 10, as the pivoting of the arm at pivot points 46 and 47 will occur in order to accommodate insertion of enlarged head 14 of snap locking member 10. The tendency of enlarged head 18A to assume the same radius of curvature as the channel siding simply enhances the locking effect.

It should be noted that another significant advantage of the invention is that the male snap-locking member 10 can be of a different color that contrasts well with letter face 2 and/or the channel siding 3. The lip 11 then serves as a color contrasting trim for the edge of the letter face, and hence, of the entire channel letter. This provides the possibility of using three separate contrasting colors in the channel letters, and can provide much better visual definition of the edges of the channel letter, and thereby greatly enhance the appearance of channel letters made in accordance with the invention.

Referring now to FIGS. 7A–7B, an embodiment of the invention is shown wherein aluminum channel siding material 3 has a J-shaped hook 56 at its upper end extending into a thin groove 55 of a plastic edge joint strip 49. Edge joint strip 49 has a thin, plastic sheet like lower section 51, and an enlarged head 50 both attached to and integral with the upper portion of edge joint strip 49. The plastic lower section 51 is preferably "filled" with aluminum 51A, as in FIG. 4 described above. The configuration of enlarged head 50 is generally triangular (although it can have various other configurations that might suit various tastes), and includes a sloped outer surface 79, a lower surface 80 that forms the upper wall of a letter edge receiving groove 54 having a rectangular cross-section. Enlarged head 50 has a back surface 81 (FIG. 7A) that forms one wall of thin groove 55 into which the J-shaped hook portion 56 extends.

Letter edge receiving groove 54 has a back surface 82 formed by sheet-like lower section 51 and also has a lower surface 83. Lower surface 83 of groove 54 is the upper surface of a horizontal snap lock member 52.

Edge joint strip 49 preferably is formed of semi-rigid plastic material which can be easily bent.

An arcuate latch member 53 is symmetrically disposed on the outer or right edge of snap lock member 52, the left edge of which is attached to and integral with back sheet 51.

A pre-cut letter face 2, similar to the ones described with reference to FIGS. 1–3, has a bottom surface in which an edge groove 56 is disposed, preferably being cut by means of a router. Groove 56 has an inner edge 84 (FIG. 7A) which engages the end of latch element 53, preventing the edge end 86 of letter face 2 from being withdrawn from groove 54, once it has been inserted therein.

The bottom portion of channel siding 3 can be the same as indicated in FIG. 3, and can be attached to letter back 4 in the manner previously described, or in a new fashion subsequently described with reference to FIGS. 9A–9B in accordance with the present invention.

In accordance with the present invention, all edges of the letter face 2 are provided with a continuous edge groove such as 56 along each edge of the letter face. The plastic edge joint strip 49 is adhesively attached to the upper inner surface of channel siding 3, which then is rolled up and, if desired, stored.

After the letter faces 2 have been pre-cut, the channel siding 3, with the edge joint strip 49 adhesively attached thereto, is bent to conform to the shape of the letter face edge. The edge 86 of letter face 2 is then inserted into and "snap-locked" into edge receiving groove 54. The snap locking occurs because the plastic material of member 52 is resilient, allowing insertion of the edge 86 of letter face 2 to push latch member 53 downward in the direction of arrow 87 (FIG. 7A) which then snaps back upward in the direction opposite to arrow 87 into edge groove 86 when letter face edge 86 is pushed all the way into groove 54.

I have found that the foregoing snap connection of the edge of letter face 2 to edge receiving groove 54 (FIG. 7A) is a very strong, tight connection, so tight that it is very difficult to remove the edge of letter face 2 from groove 54 of edge joint strip 49. The connection is so strong, and seals the edge of the letter face 2 to the edge joint strip 49 so well that ordinarily no glue needs to be used to improve that connection or to provide a better seal against water and/or dust. However, glue can be applied in groove 54 if desired.

This technique avoids the need to prepare a pegboard or jig, as earlier described, for holding the edge joint strip 49 tightly against the edge of letter face 2 until the glue dries. Instead, the entire length of pre-bent channel siding 3 can be simply and quickly snapped onto the letter face 2.

The sloped edge 79 of enlarged head 50 provides an attractive border 4, letter face 2. The color of enlarged head 50 can contrast to the color of letter face 2 to visibly clearly define the edges of the channel letter.

The configuration of latch element 53 can be symmetrical if this is necessary to prevent the upward or downward deflection of member 52 that otherwise might occur at bends in the aluminum siding. However, up to now, this has not been found to be necessary.

The above-described technique and structure avoids the need to attach the male member 10 of FIG. 3 to the edge of the letter face 2, and thereby saves a significant amount of labor and time, and hence cost.

Referring now to FIGS. 9A-9B, an alternate technique to the one described with reference to FIG. 3 for attaching the bottom end of the channel siding 51 to the letter back 4 is described.

A plurality of metal or plastic brackets such as 60 in FIG. 9A are provided, each having a horizontal section 61 with a hole 66 therein through which a screw 68 (FIG. 9B) extends to attach the bracket 60 to the edge of a letter back 4.

The bracket 60 has a sloped section 62, the slope of which is the same as the slope of the surface 44 of letter back 4, connected at its upper end to section 61. A vertical section 63 connected to the lower end of section 62 and extending from the lower edge of sloped section 62 upward has a V-shaped pin-receiving groove 64 located at the bottom of and in open communication with V groove 64.

As best seen in FIG. 9B, a small peg 67 horizontally aligned with retaining aperture 65 extends horizontally from a mid portion of slope member 62 into a corresponding hole 89 in the sloped surface 44 of letter back 4. In accordance with this embodiment of the invention, horizontal, precisely spaced holes 89 are drilled in the sloped surface 44 of letter back 4 for receiving the horizontal peg 67. At the same time, i.e., in the same operation, holes are drilled through the lower lip 59 of channel siding 3 in alignment with the holes 89. The holes 89 and corresponding holes in channel siding 3 are strategically placed around the letter back 4 so as to adequately fasten the channel side 3 thereto.

The V-shaped groove 64 receives rivet pins such as 70 that are attached to the lower edge of aluminum channel siding 3. The diameter of pin 70 is less than the diameter of the enlarged aperture 65, but greater than the gap between the bottom edges of the V-shaped groove 64, so that when the pin 70 is forced downward into the V-shaped opening 64, it snaps into and is locked into aperture 65.

A round retaining flange 69 is attached to and is integral with the outer end of pin 70. A riveting operation or the like between a flange 71, which is attached to the mid portion of pin 70 and connected by the shank of pin 70 to rivet head 72 and extends through an opening in the bottom lip of aluminum channel siding 3, rigidly attaches pin 70 to channel siding 3.

Thus, after the letter face 2 and its aluminum channel siding 3 have been attached together by the edge joint strip 49, as described above, the channel letter may be completed by simply forcing each of the pins onto an appropriate ones of the brackets 60, as shown in FIG. 9B.

Although the particular dimensions of the edge joint strip 49 are not critical, some exemplary dimensions are given. The depth of groove 55 can be approximately 3/16 inch, the depth of edge receiving groove 54 can be 5/32 inch, the distance between the bottom of groove 55 and the upper wall 80 of groove 54 can be 3/32 inch, the width (in the vertical direction) of groove 54 can be 7/32 inch, the outward extend of each side of symmetrical latch element 53 can be 1/16 inch, the distance between surface 85 and wall 82 can be 3/32 inch, the distance between the wall 82 of the groove and the outermost surface of latch element 53 can be 5/32 inch.

Referring now to FIG. 8, an alternate embodiment of the invention of FIGS. 7A-7B is shown, wherein the enlarged head 50 is integral with channel siding 51, which is "aluminum-filled" by sheet 75 of aluminum. The manner in which the edge 81 of letter face 2 is inserted into groove 54 is identical to that described above.

An integral foot 76 is provided on the bottom edge of channel siding 51 to allow the assembly consisting of the channel siding 51 and integral edge joint 50 and an attached letter face 2 to be glued to a suitable backing plate such as 77, which may be of wood or plastic material that contrasts in color to the color of enlarged head 50, which in turn contrasts with the color of letter face 2.

While the invention has been described with reference to a particular embodiment thereof, those skilled in the art will be able to make numerous variations to the described embodiment of the invention without departing from the true spirit and scope thereof. It is intended that the invention encompass all variations or modifications to the disclosed elements and steps which produce substantially the same function in substantially the same way to achieve substantially the same result. For example, even though the disclosed embodiment of the invention has the male snap locking member attached to the channel letter and the female snap locking member attached to the channel siding, it is possible to reverse the position of the male snap locking function and the female snap locking function. It is not essential that the lip 11 of the male snap locking element 10 be as shown in the drawings, and in fact, if it were desired to cover the outer edges of the base section 19B and the channel siding 3, a lip or flange could be provided on the section J to do so. Furthermore, the upper portion 19B of the base 19 of the female snap locking member 17 could be omitted, so that the neck of the male snap locking member directly abuts the inner surface of the channel siding 3. The techniques described also could be used to snap-attach rectangular (or otherwise shaped) single-faced small signs, wherein letters or other indicia are painted, screened, or cut out (for example) on the single face.

I claim:

1. A method of making a channel letter, comprising the steps of:

(a) providing a piece of channel siding and attaching edge joint means to an outer edge portion of the inner surface of the channel siding;

(b) providing a letter face having an outer face, inner face, and an edge;

(c) forming a continuous edge groove disposed in the inner surface along the edge of the letter face;

(d) bending said piece of channel siding having an inner surface, an outer surface, front edge and a rear edge (to conform to the shape of the letter face; and (e) inserting the edge of the letter face into a groove in the edge joint means and causing snap-attaching means to extend into the edge groove to attach the letter face to the channel siding.

2. The method of claim 1 wherein the edge joint means includes a plastic strip having an edge joint groove therein, the method including holding the edge of the letter face in the edge joint groove by snapping an element of the snap-attaching means into the edge groove.

3. The method of claim 2 wherein the edge joint means is composed of plastic, the method including adhesively attaching the edge joint means to the outer edge portion of the inner surface of the channel siding, and wherein the channel siding is composed of metal sheet material.

4. The method of claim 2 including providing an enlarged outer portion of the edge joint means that forms upper wall surface of the edge joint groove, and providing a relatively thin wall forming the lower wall surface of the edge joint groove, the snap-attaching means including a head attached to the outer edge of the thin wall for extending into the edge groove of the letter face, the method including symmetrically disposing the head on the outer edge of the wall, so that bending of the edge joint means does not result in unsymmetrical forces in the head that move the head out of the edge groove of the letter face.

5. The method of claim 4 including bending back an outer edge portion of the channel siding and extending it into a thin slot in an outer portion of the head on the edge joint means.

* * * * *